United States Patent Office 2,777,204
Patented Jan. 15, 1957

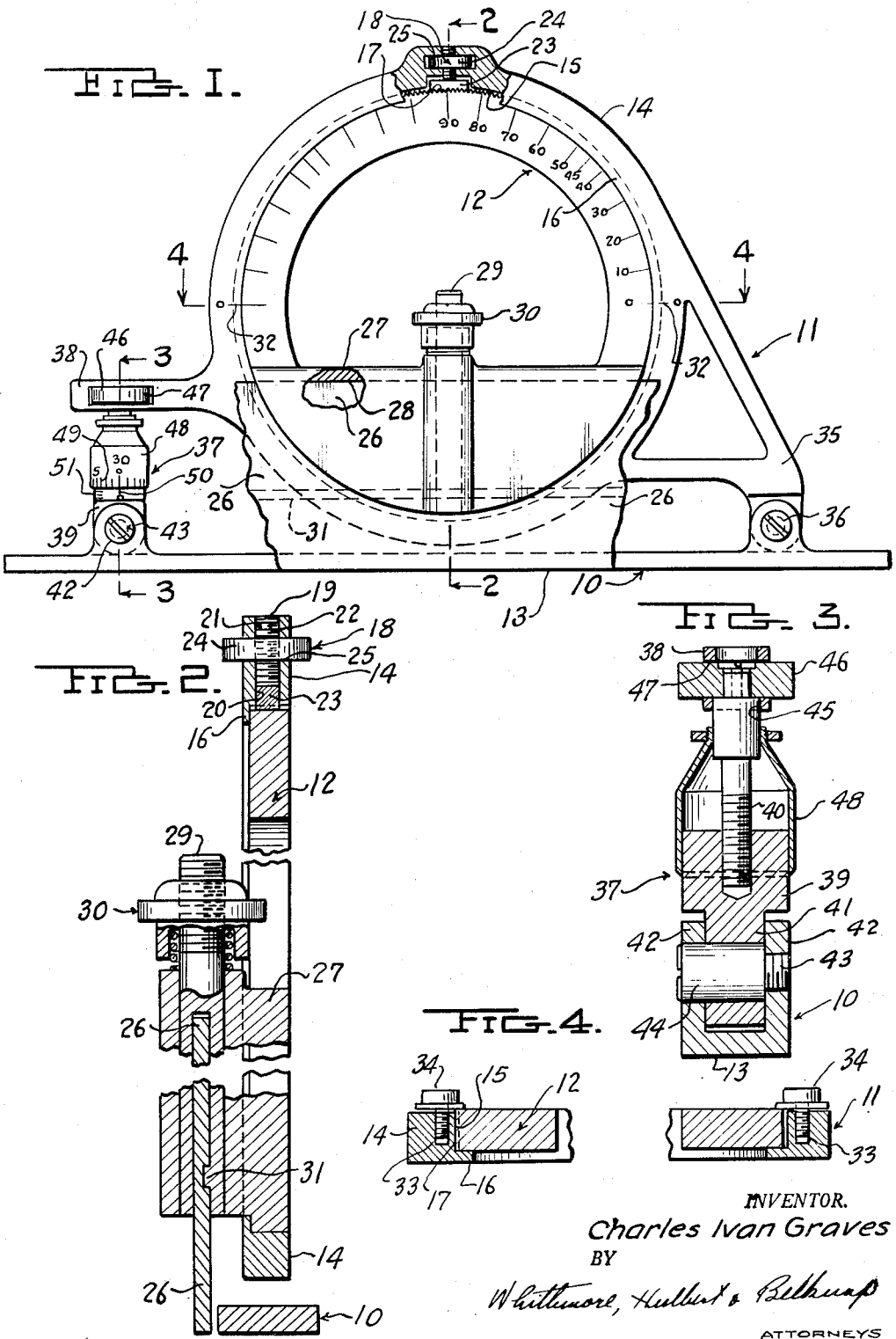
Jan. 15, 1957 — C. I. GRAVES — 2,777,204
PROTRACTOR
Filed Dec. 7, 1953
INVENTOR.
Charles Ivan Graves
BY
Whittemore, Hulbert & Belknap
ATTORNEYS

2,777,204

PROTRACTOR

Charles Ivan Graves, Romeo, Mich.

Application December 7, 1953, Serial No. 396,406

4 Claims. (Cl. 33—102)

This invention relates generally to instruments for measuring angles and refers more particularly to improvements in adjustable protractors.

It is an object of this invention to provide a protractor rendering it possible to more accurately measure or lay out any angle within the 360 degree range in less time and with less effort than heretofore required with conventional equipment. In accordance with this invention, the protractor has a relatively fast or preliminary adjustment which is accurate within the limits of, say, one degree, and has a second micrometer adjustment which is accurate to small fractions of a degree.

It is another object of this invention to provide a protractor wherein the preliminary adjustment is accomplished by a ring supported in a frame for rotation and having serrations at the periphery engageable with corresponding serrations on a releasable latch device for securely holding the ring in predetermined positions of rotation relative to the frame.

It is still another object of this invention to pivotally support the frame on a reference or base plate and to provide a micrometer adjustment for swinging the frame together with the ring relative to base plate in order to afford the fine or micrometer setting.

The foregoing as well as other objects will be made more apparent as this description proceeds especially when considered in connection with the accompanying drawing, wherein:

Figure 1 is a front elevational view of a protractor embodying the features of this invention;

Figures 2, 3 and 4 are respectively sectional views taken on the lines 2—2, 3—3 and 4—4 of Figure 1.

The protractor selected herein for the purpose of illustrating the invention comprises a base or reference plate 10, a frame 11 carried by the plate 10, and a ring 12 supported on the frame 11 for rotation. As viewed in Figure 1 of the drawing the bottom surface 13 of the plate 10 is uninterrupted and is formed perfectly flat enabling the same to be used as a straight edge. The frame 11 is positioned above the plate 10 and has an annular part 14. The part 14 is formed with an internal annular bearing surface 15 and with an annular flange 16 projecting inwardly beyond the bearing surface 15 at the front side of the frame 11.

The ring 12 is insertable into the annular part 14 from the rear side of the frame 11 in abutting engagement with the flange 16 and has an external annular bearing surface 17 engageable with the internal bearing surface 15. The arrangement is such that the ring 12 is supported in concentric relationship to the annular part 14 and is rotatable relative to the latter.

The annular surface 17 of the ring 12 is formed with serrations extending axially of the ring and spaced from one another circumferentially of the ring. In the present instance, the spacing between adjacent serrations corresponds to one degree of rotation of the ring 12 relative to the frame 11. In any case the serrations engage corresponding serrations on a latch device 18 mounted on the frame 11 at the top of the latter.

As shown in Figures 1 and 2 of the drawing, the frame 11 is formed with a radially extending bore 19 at the top of the annular part 14. The radially inner end of the bore 19 opens into a slot 20 which is formed in the annular part 14 of the frame 11 and which is elongated circumferentially of the ring 12. The latch device 18 comprises a stud 21 having a threaded shank 22 positioned within the bore 19 and having a head 23 supported in the slot 20. The inner surface of the head 23 is formed with serrations which match the serrations on the annular external surface 17 of the ring 12 and engage the latter. In addition, the latch device 18 has an annular nut 24 threaded on the shank 22 of the stud 21 and being of sufficient diameter to project beyond opposite sides of the frame 14 through an opening 25 formed in the annular part 14 of the frame 11. Thus, the nut 24 is readily accessible for manipulation by the user and rotation of the nut 24 serves to engage the head 23 of the latch device 18 with or disengage the same from the serrations on the ring 12, depending on the direction of rotation of the nut 24. When the latch device is in a position wherein the serrations on the head 23 engage the adjacent serrations on the ring 12, the latter is held against rotation relative to the frame 11.

As is usually the case with protractors having an adjustable or rotatable ring, provision is made for supporting a straight edge 26 on the ring. The straight edge 26 is usually in the form of a steel rule and the ring 12 has a solid part 27 at the front side which is fashioned with an outwardly opening slot 28 of sufficient width to permit passage of the straight edge therethrough. As shown in Figure 2 of the drawing, the straight edge is clamped in place by a stud 29 and a thumb nut 30. The stud 29 extends radially with respect to the ring 12 and the nut 30 threadably engages the radially inner end of the stud 29. In accordance with conventional practice the outer end of the stud 29 is also slotted to receive the straight edge 26 and a projection 31 is provided on the stud in a position to project into a groove formed in the adjacent side of the straight edge 26. The lower end of the nut 30 abuts an annular shoulder on the part 27 so that rotation of the nut 30 in one direction relative to the stud 29 causes movement of the stud in a radially inward direction and clamps the inner edge of the straight edge 26 against the bottom of the slot 28, in accordance with conventional practice.

As shown in Figure 1 of the drawing, the front face of the ring 12 is graduated throughout 180° and the graduations selectively register with zero degree reference lines 32 provided on the front side of the frame 11 in 180° spaced relationship. In the present instance, the front face of the ring 12 is graduated in degrees corresponding to the spacing of the serrations on the external annular surface 17 of the ring so that each increment of rotation of the ring 12 may be readily noted. In Figure 1 of the drawing, the ring 12 is shown in its zero degree position wherein the straight edge is supported in parallel relationship to the reference surface 13 on the plate 10. As stated above, the ring 12 is positively held in its various selected positions with respect to the frame 11 by the latch device 18. If desired, axial displacement of the ring 12 relative to the frame 14 may be avoided by studs 33 shown in Figure 4 of the drawing as located at diametrically opposite sides of the ring 12. The studs 33 have shank portions which threadably engage the frame 14 and have head portions 34 of sufficient dimension to overlie the rear side of the ring 12.

It has also been stated above that the frame 11 is carried by the plate 10 and in this connection it will be noted that the frame 11 is fashioned at one side thereof with a lug or projection 35. The projection 35 is pivoted to the plate 10 at the top side of the latter by a pivot pin 36 which extends parallel to the axis of rotation of the ring 12. Thus, the frame 11 together with the ring 12 and straight edge 26 may be swung about the axis of the pin 36 in directions toward and away from the reference or base plate 10. It will be apparent that swinging the frame 11 and associated parts about the axis of the pin 36 changes the angular relationship between the plate 10 and the straight edge 26 independently of rotation of the ring 12 relative to the frame 11.

In accordance with the present invention, a micrometer adjustment 37 is provided for swinging the frame 11 to change the angular relationship between the straight edge 26 and the reference plate 10.

The micrometer adjustment 37 connects the free end of the plate 10 to a lug 38 which projects from the side of the frame 11 opposite the side from which the lug 35 projects. The micrometer adjustment is in the form of a coupling having a part 39 which is pivoted to the plate 10 and having a rotatable part 40 which is connected to the lug 38. As shown in Figure 3 of the drawing, the part 39 is fashioned with a depending portion 41 which extends between upstanding ears 42 on the plate 10. A stud 43 is secured to one of the ears 42 and has a cylindrical portion 44 which extends through aligned openings in the other ear 42 and in the portion 41 of the part 39. The axis of the stud 43 is parallel to the axis of the pivot pin 36 so that the stud 43 enables rocking movement of the part 39 relative to the plate 10 upon swinging movement of the frame 11. The part 40 is in the form of a vertical stud or screw having the lower end projecting into the part 39 and threadably engaging the latter. The upper end of the stud 43 extends through an opening 45 in the lug 38 and a thumb nut 46 is mounted thereon. The nut 46 is arranged in a slot 47 formed in the lug 38 and the diameter of the nut 46 is such that the latter projects beyond opposite sides of the lug 38 for convenient manipulation by the operator. Clamped or otherwise secured to the stud 40 immediately below the lug 38 is a barrel member 48 having the lower end encircling the upper end of the part 39.

It follows from the above that the stud 40 acts as a micrometer screw and rotation of the latter by the thumb nut 46 reacts on the lug 38 to swing the frame 11 relative to the plate 10 about the axis of the pivot pin 36. The arrangement is such that the ring 12 may be manipulated to obtain a preliminary or relatively rough adjustment of the protractor to within, say, one degree of accuracy, and the micrometer adjustment may then be manipulated to obtain an accurate movement of the protractor to within a fraction of a degree. The barrel 48 and the part 39 are calibrated in much the same manner as a conventional micrometer except that the calibrations are arranged to indicate minutes and fractions of minutes of degrees. In the present instance, the barrel 48 has an annular series of circumferentially spaced graduations 49 at the bottom thereof which register with a zero graduation 50 on the part 39 and the part 39 has vertically spaced graduations 51. The graduations 49 correspond to predetermined degrees of rotation of the micrometer screw 40 relative to the part 39 and the vertical graduations 51 correspond to fractions of degrees. In this connection it is important to note that the distance between the axis of the pivot 36 and the axis of the stud 43 is predetermined to have a definite relationship with the number of threads per inch provided on the micrometer screw 40. In the present instance, the above dimension and the number of threads per inch on the micrometer screw 40 are such that four complete turns of the micrometer screw 40 results in a movement of the frame 11 throughout one degree of travel. However, the above relationship is not critical and may be varied to suit any desired specifications.

What I claim as my invention is:

1. A protractor comprising a base part presenting a straight edge surface which is free of projections and uninterrupted at and between its ends, an annular part having a pivotal connection to said base part on an axis paralleling and normal to the length of said surface, said annular part having an annular bearing surface, a rotatable member supported on said annular bearing surface, said member having an elongated straight edge element mounted thereon for longitudinal adjustment in a plane through said first named straight edge surface, an adjustment device to determine a coarse relative adjustment of said straight edge element and straight edge surface by rotation of said member on said part, and an adjustable coupling connected between said annular part and base part, in spaced relation to the pivotal connection thereof, to effect a fine relative adjustment of said straight edge element and surface by relative bodily shifting of said parts.

2. A protractor comprising a base part presenting a straight edge surface which is free of projections and uninterrupted at and between its ends, an annular part having a pivotal connection to said base part on an axis paralleling and normal to the length of said surface, said annular part having an annular bearing surface, a rotatable member supported on said annular bearing surface, said member having an elongated straight edge element mounted thereon for longitudinal adjustment in a plane through said first named straight edge surface, a releasable adjustment device including releasable coacting stops on said annular part and rotatable member to determine a coarse relative adjustment of said straight edge element and straight edge surface by rotation of said member on said part, and an adjustable coupling connected between said annular part and base part, in spaced relation to the pivotal connection thereof, to effect a fine relative adjustment of said straight edge element and surface by relative bodily shifting of said parts.

3. A protractor comprising a base part presenting a straight edge surface which is free of projections and uninterrupted at and between its ends, an annular part having a pivotal connection to said base part on an axis paralleling and normal to the length of said surface, said annular part having an annular bearing surface, a rotatable member supported on said annular bearing surface, said member having an elongated straight edge element mounted thereon for longitudinal adjustment in a plane through said first named straight edge surface, an adjustment device to determine a coarse relative adjustment of said straight edge element and straight edge surface by rotation of said member on said part, and an adjustable coupling connected between said annular part and base part, in spaced relation to the pivotal connection thereof, to effect a fine relative adjustment of said straight edge element and surface by relative bodily shifting of said parts, said coupling comprising a calibrated element pivoted on one of said parts and a further calibrated element rotatably mounted on the other part and threadedly engaging the first named calibrated element.

4. A protractor comprising a base part presenting a straight edge surface which is free of projections and uninterrupted at and between its ends, an annular part having a pivotal connection to said base part on an axis paralleling and normal to the length of said surface, said annular part having an annular bearing surface, a rotatable member supported on said annular bearing surface, said member having an elongated straight edge element mounted thereon for longitudinal adjustment in a plane through said first named straight edge surface, a releasable adjustment device including releasable coacting stops on said annular part and rotatable member to determine a coarse relative adjustment of said straight edge element and straight edge surface by rotation of said member on said part, and an adjustable coupling connected between said annular part and base part, in spaced relation to the pivotal connection thereof, to effect a fine relative adjustment of said straight edge element and surface by relative bodily shifting of said parts, said coupling comprising a calibrated element pivoted on one of said parts and a further calibrated element rotatably mounted on the other part and threadedly engaging the first named calibrated element.

References Cited in the file of this patent

UNITED STATES PATENTS

| | | |
|---|---|---|
| 759,239 | Clark | May 10, 1904 |
| 1,268,620 | Renstrom | June 4, 1918 |
| 1,358,604 | Zhukoff | Nov. 9, 1920 |
| 1,661,096 | Rowe | Feb. 28, 1928 |
| 2,093,048 | Ike | Sept. 4, 1937 |
| 2,239,229 | Harris | Apr. 22, 1941 |
| 2,272,491 | Wagner et al. | Feb. 10, 1942 |
| 2,443,364 | Vancura | June 15, 1948 |
| 2,594,574 | Marsden | Apr. 29, 1952 |